Aug. 29, 1961 F. OSTWALD 2,997,984
VALVE MECHANISM TO CONTROL MOTOR FLUID SUPPLY
Filed April 9, 1956 4 Sheets-Sheet 3

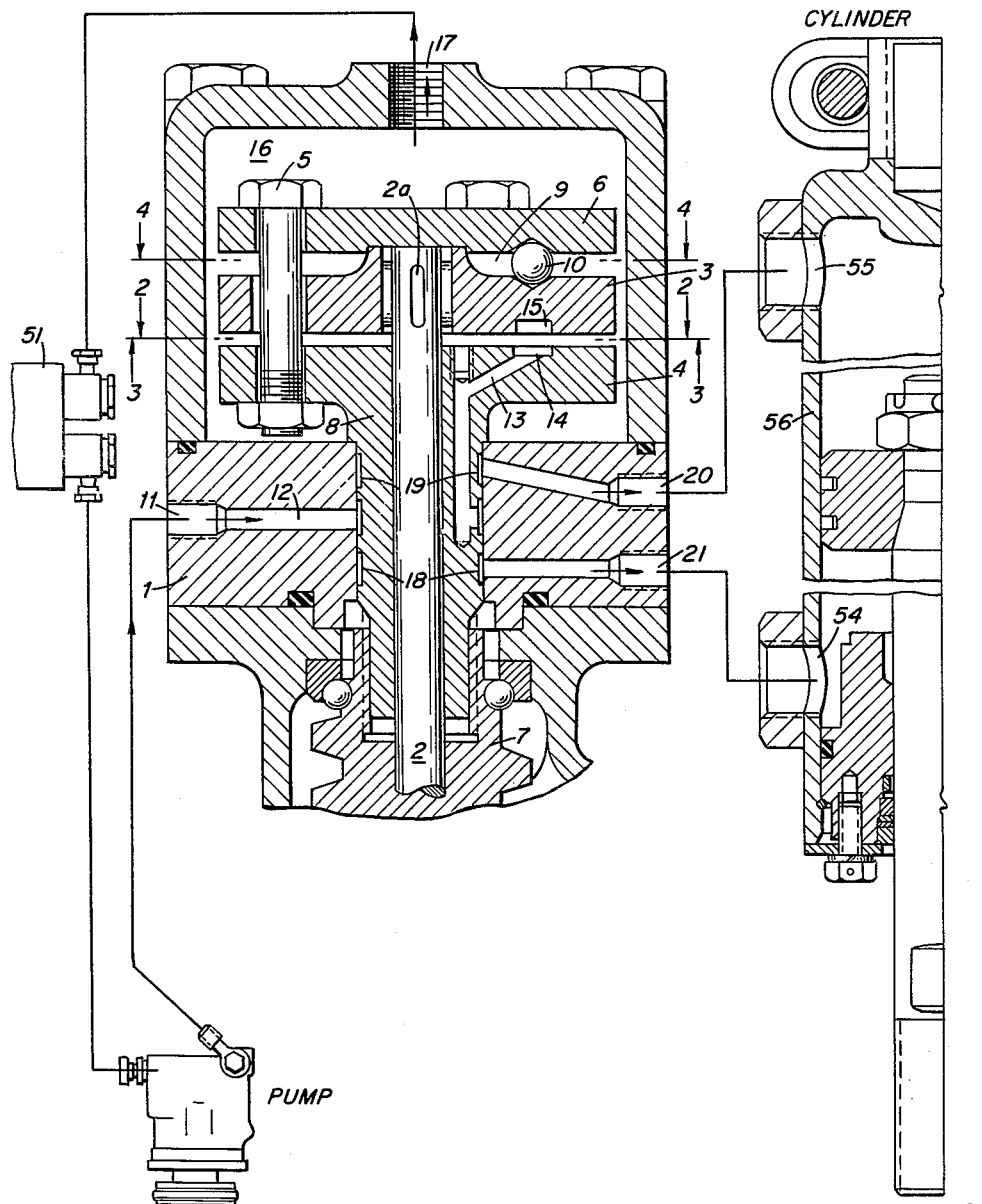

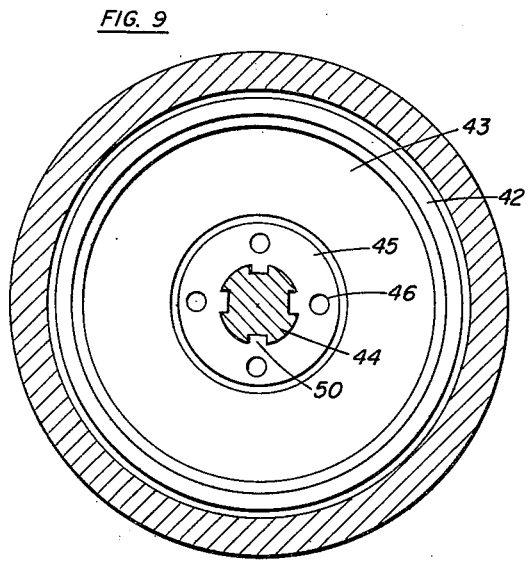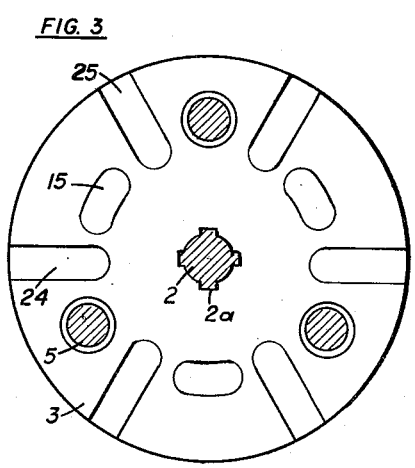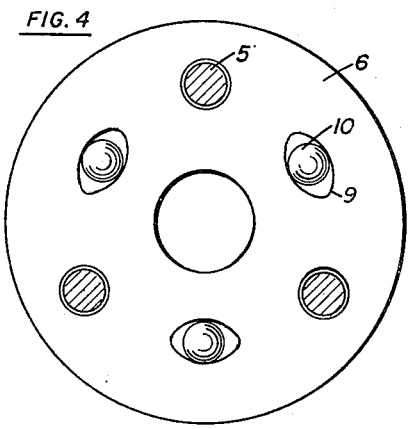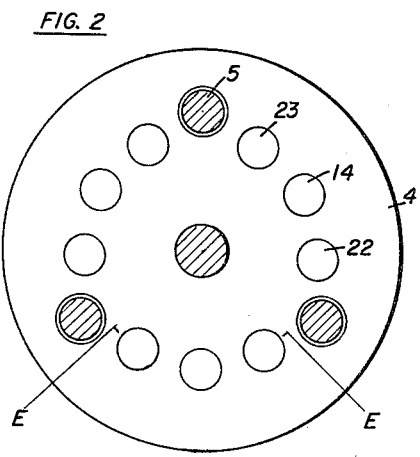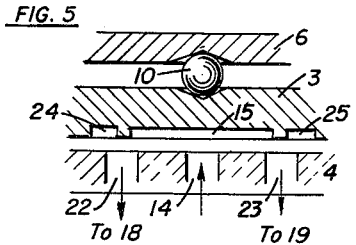

FRITZ OSTWALD
INVENTOR.

BY MESTERN & FREY

United States Patent Office 2,997,984
Patented Aug. 29, 1961

2,997,984
VALVE MECHANISM TO CONTROL MOTOR FLUID SUPPLY
Fritz Ostwald, Heppenheim (Bergstrasse), Germany, assignor to Alfred Teves, Maschinen- und Armaturenfabrik KG, Frankfurt am Main, Germany
Filed Apr. 9, 1956, Ser. No. 576,887
Claims priority, application Germany Apr. 9, 1955
4 Claims. (Cl. 121—38)

The invention relates to rotary valve mechanisms, more particularly for power drives in motor vehicles.

The conventional valves are cylindrical members which are closely fitted into a bore and which are provided with grooves and bores, as is the casing, for the passage of hydraulic fluid. The valves are under pressure action of the hydraulic fluid from all sides, and are rotated or shifted as the case may be for executing a controlling action. Similar devices are plane valves or rotary ball valves. These types of valve mechanisms are superior control organs as compared to conventional valves because they can easily be relieved from pressure.

As is known, a given ratio can be established in cylindrical valves between the displacement force and the effective pressure by placing the frontal face of the slide or parts thereof under the action of hydraulic pressure. Valves of this type, however, are only known for translatory movement. When rotary movement occurs, it has to be converted by means of levers, gears, etc., into a translatory movement in order to obtain the desired connection between rotary force and effective pressure.

The device according to the invention relates to hydraulically operated rotary valves, which perform directly through rotation of the driving shaft, a displacement and therewith a steering action, a ratio being set up between rotary force and effective pressure.

According to the invention a rotary valve is provided consisting of two co-axially arranged slidable disks, one being a driving disk non-rotatably mounted on the driving shaft, and the other being a driven disk oppositely arranged to the driving disk with clearance therebetween; also provided are members which control the relative position of the two oppositely disposed sliding disks, the two disks being mutually displaceable by rotation and by axial shifting. The positioning members may either be in the form of elements which space the two disks apart, or which pull them together.

In the following, the invention will be more fully described with reference to the accompanying drawings, but it should be understood that these are given by way of illustration and not of limitation and that many changes can be made in the details without departing from the spirit of the invention.

In the accompanying drawing:

FIG. 1 is a longitudinal section through the device according to the invention;

FIG. 2 is a plan view taken along line 2—2 of FIG. 1 and viewed in the direction of the arrows A—A;

FIG. 3 is a plan view taken along the same line and viewed in the direction of the arrows B—B;

FIG. 4 is a plan view taken along line 4—4 of FIG. 1 and viewed in the direction of the arrows C—C;

FIG. 5 is a section along lines E—E of FIG. 2;

FIG. 9 is a top view along line 9—9 of FIG. 7.

Figure 6:
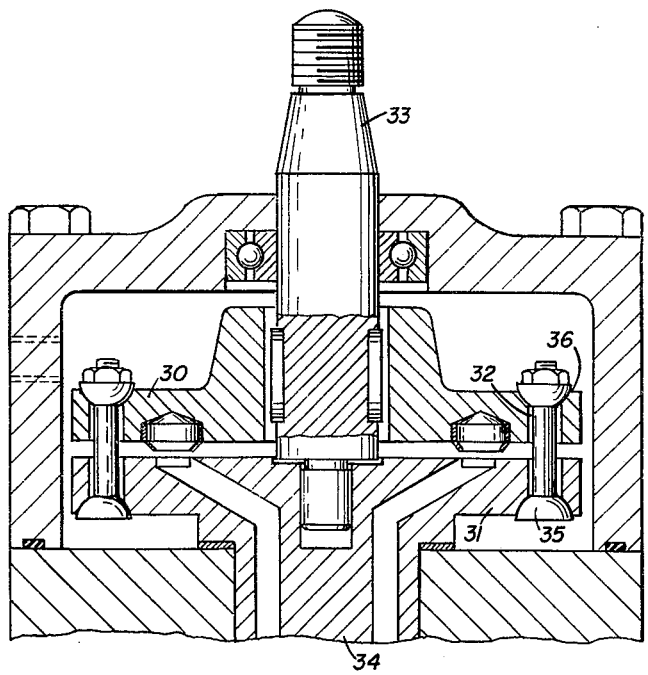
FIG. 6 is a longitudinal section of another embodiment of the device.

The device shown in FIG. 1 is arranged in a housing 1 and comprises a driving or steering shaft 2 and a disk-shaped rotary valve member 3 which engages in grooves 2a provided in said shaft. Opposite the disc 3, a driven disk 4 is arranged with clearance between the disks. A bolt-shaped spacer member 5 holds the two disks and a top plate 6 in assembled position. The drive further comprises a worm 7 which engages in a manner known per se a lever stud on a cross shaft lever (not shown). The worm 7 has a rigid connection with the driven shaft 8 attached to disk 4. Between plate 6 and driving disk 3 there are a number of oppositely disposed recesses 9 with slanting faces in which balls 10 are received. Bolt 5, which serves as a spacer, is arranged with clearance in disk 3 thus permitting a rotation of the driving disk 3 with respect to the driven disk 4. A pipeline 11 serves for admission of hydraulic fluid in a circular conduit 12 which is connected by a bore 13 with the admission passage 14 in disc 4. A groove 15 is provided in disk 3 which registers with passage 14. Discharge of the hydraulic fluid takes place either between disc 4 and disc 3 into a space 16 in the casing and from there over a discharge conduit 17 into a pressure fluid reservoir 51 or, upon actuation of the rotary valve mechanism, fluid will pass by way of conduits 52, 53 into annular ducts 18 and 19 of shaft 8, and thereby into lines 20 and 21 which lead to spaces 54, 55 in the operating cylinder 56.

FIG. 2 shows admission and discharge lines 22 and 23 leading to conduits 52, 53 arranged at both sides of admission line 14.

In FIG. 3 corresponding grooves and slots arranged in disc 3 to receive these lines are shown. At each side of groove 15, slots 24 and 25 are disposed through which hydraulic fluid is conducted to space 16 in the casing. This hydraulic fluid, displaced from the operating cylinder spaces 54 and 55, passes into either discharge line 22 or 23 before entering said space 16 whence it flows into tank 51 through bore 17 in the casing.

Figure 3A:
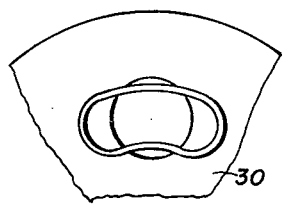
FIGS. 3a and 3b show details thereof.
Figure 3B:
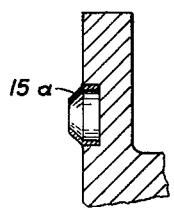

Instead of the bean-shaped groove 15 in the casing, a circular box may be arranged in a corresponding bore of the driving disk, the projecting part of the box being so formed that it will have a cross section corresponding to the groove. This is shown in FIGS. 3a and 3b.

FIG. 4 shows a recess 9 with slanting faces for the ball 10, a number of which serve as forcing apart elements.

FIG. 5 is a section through FIG. 1 wherein admission lines 14, and lines 22 and 23 in the driven disk 4 are shown, as well as balls 10 forcing apart disc 3 and plate 6. Likewise shown in this figure are slots 24 and 25 and groove 15 in disk 3.

The operation is as follows:

When a rotational force acts on the steering shaft, disk 3 is turned and the balls 10 slide up the slanting surfaces, thereby causing a displacement of the driving disk 3 and the driven disk 4 with respect to each other. The displacement of the disks is limited by the clearance between them and the bolt 5. Due to the displacement, the grooves 15 and slots 24, 25 in the driving disk 3 are displaced with respect to the admission and discharge lines 22 and 23 as well as 14 in disc 4, and hydraulic fluid is admitted to one or the other of the operating cylinders, 54, 55, depending on the rotational direction of the disks. The two possible alignments of the various ducts and channels will now be explained in more detail. In one direction of relative angular displacement of the two valve discs 3 and 4, the operational fluid entering through admission passage 14 and groove 15 will pass through admission and discharge channel 22, conduit 52, annular duct 18 and line 21 to space 54 of the operating cylinder 56. Simultaneously operational fluid will escape from space 55 of the operating cylinder 56 through line 20, annular duct 19, conduit 53, admission and discharge channel 23, slot 25, space 16, opening 17 to reservoir 51.

In the other direction of the relative angular displacement of the two valve discs 3 and 4, the fluid paths between the two admission and discharge channels 22 and 23 will be reversed, since groove 15 is now aligned with channel 23, while channel 22 is positioned opposite the slot 24. In this case, the fluid will pass through channel 23, conduit 53, annular duct 19, and line 20 into the space 55 of the operating cylinder 56 and escape from the space 54 of the operating cylinder through line 21, annular duct 18, conduit 52 to the admission and discharge channel 22 which is now aligned with slot 24 eventually leading to the reservoir 51.

The two simultaneous fluid paths traced above will be independent of each other only if there is no space between the two disks 3 and 4. When the two disks are spaced apart, the fluid paths will divide in the space between the two disks 3 and 4. When the disk 3 is not yet in fluid tight relation to the driven disk 4, part of the entering fluid is admitted to one cylinder space while the other part escapes to the space 16 in the casing.

Let us now take the case in which the displacement force is sufficient to press the two discs together in liquid tight relationship, so that the hydraulic fluid will be completely admitted to one cylinder space. In that case, the fluid forced out of the other cylinder space will be admitted without pressure to the slots in the driving disk which are then so located that the fluid can escape into the space in the casing.

When the device is actuated, the operational pressure then obtaining acts axially on the disk and has a tendency to return it to neutral position. Since, by means of the expansion members or tension members the axial movement is always coupled with the rotational movement, the rotational force is dependent on the instant operational pressure, so that there is by means of the invention a dependence set up between displacement force in rotational direction and effective pressure.

A second embodiment of the rotary valve mechanism according to the invention is illustrated in FIG. 6. The main difference from the first embodiment consists therein that a driving disk 30 and the driven disk 31 are coupled by means of tension members. This makes the arrangement of an abutment plate, such as plate 6 in FIG. 1, dispensable. The driving shaft in FIG. 6 is designated by 33, the driven shaft by 34. The tensioning member is a bolt 32 having two substantially hemispherical heads, one at either end. These heads are in engagement with matingly shaped recesses 36 at the surface of disks 30 and 31, facing away from each other. The bolts forming the tension members 32 are mounted with clearance in the discs. When the driving disk is rotated, bolt 32 is placed obliquely and pushes the disk 31 against disk 30. Admission and discharge lines for the fluid, as well as grooves and slots are arranged in the same manner as described with reference to the other embodiment.

In both embodiments stops, such as bolts 5 or 32, are arranged between driving disk and driven disk, which limits their relative displacement.

Figure 7:
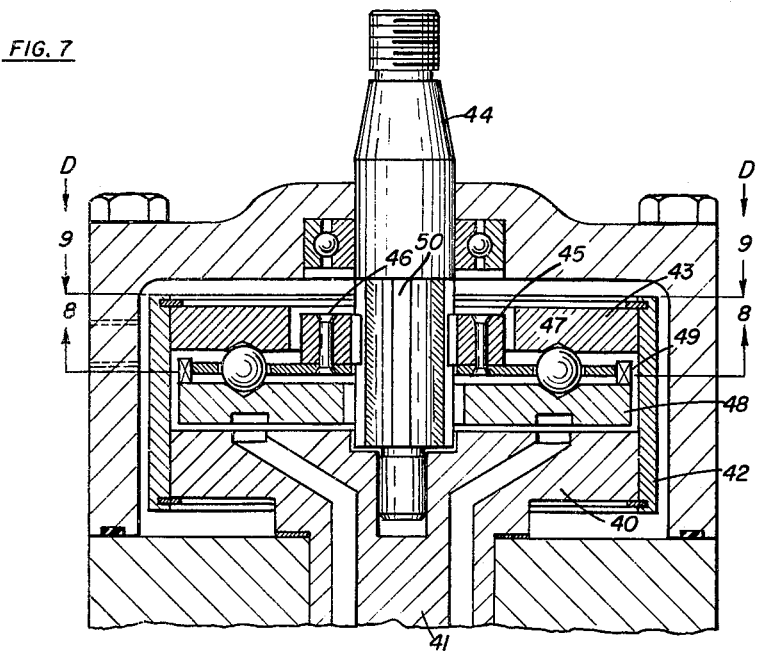
FIG. 7 is a longitudinal section of yet another embodiment of the device.
Figure 8:
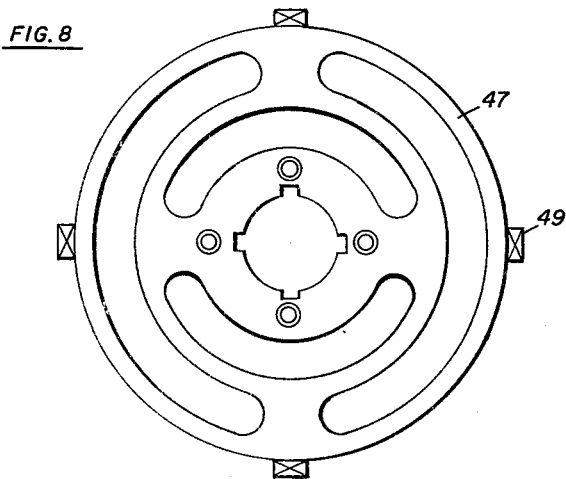
FIG. 8 is a view of the centering spider of the last mentioned device.

Yet another embodiment of the device is shown in FIGS. 7, 8 and 9. This is distinguished from the two other embodiments by allowing a friction-free axial displacement of the valve, whereas the other two embodiments were only slideable on the grooved shafts, but not rotatable thereon. Upon a torsional moment acting between shaft and valve, the latter can slide only with difficulty in axial direction because of friction at the grooved wall. This inconvenience is overcome by the arrangement now to be described.

As shown in FIGS. 7 and 9, the driven disc 40 and driven shaft 41 are fixedly connected by way of a cylindrical piece 42 with an abutment plate 43. The driving shaft 44 is provided with a member 45 rigidly mounted thereon. This member engages with grooves 50 in the driving shaft and is connected by means of rivets 46 to a centering spider 47 consisting of a steel sheet and being capable of yielding axially. The spider has peripheral flanges 49 for connecting it to the driving disk 48, which is arranged on the shaft without engagement therewith. Between plate 43 and driving disk 48, balls are arranged as in FIG. 1, which serve as expanding members and which engage with recesses formed in both discs 48 and 43.

The device operates as follows: When the shaft is rotated, the balls roll up the slanting surfaces of the recesses and force the driving disk and driven disk together. Due to the fact that the driving disk is rigidly connected with the centering spider which engages with grooves in the shaft, the driving disk is secured against relative displacement from the shaft without direct engagement therewith. Furthermore, the axial yielding of the spider makes possible an axial displacement of the disk in spite of the immovable mounting of the guide member 45 of spider 48, so that a friction-free displacement of the driving disk upon the shaft can be accomplished. The spider is shown in plan view in FIG. 8 and designated by 47.

The advantages of the device according to the invention are the following: The pressures between the disks, which may attain high values, are absorbed directly by the coupling members acting on the two disks; also, these coupling members are moving only when both disks turn toward each other, whereas they remain immobile when the two disks are moved in common. Therefore, no external forces will be created which cause friction losses and require sturdy bearings and casings.

Another advantage consists in the fact that, contrary to conventional valves in devices of this type, it is not necessary to manufacture the cooperating disks with a perfect fit. For proper functioning and sealing it is only necessary that the surfaces are well ground, which is a comparatively inexpensive requirement. Furthermore, the adjustment of the coupling members is important, which can be done after assembly.

Sensitivity to soiling is diminished in a rotary valve with coupling members as compared to conventional designs, since the sealing faces are not displaced parallel with minimum action, a case in which dirt particles easily cause a jagging of the leading edges, but may be lifted from each other as desired and depending on the kinematics of the coupling members, whereafter they are again put together at a certain angle. Foreign matter, which may have deposited, can easily be rinsed off.

Rotary valves as described above may be used either for selective control of one or several lines of hydraulic fluids to one or more attachment lines, more particularly for the regulation of pressure in a hydraulically operated motor with differential control (oil motor, double-acting engine cylinder, etc.).

It should be understood that it is within the scope of the present invention to make the driving and the driven disks in spherical or other forms which have a symmetry of rotation.

What I claim is:

1. In a motor vehicle provided with a power drive having a hydraulic operating cylinder and a steering shaft, a rotary valve mechanism comprising a cylindrical housing having a first end wall provided with a central outlet, a second end wall having on its periphery an inlet port and second and third outlet ports opposite said inlet port; a driven disk spaced adjacent said second wall; a driving disk secured to the steering shaft for rotation therewith and spaced from said driven disk, both said disks having grooves registering with one another for permitting the flow of hydraulic fluid between the disks, said driving disk having slanted recesses on its face which is directed towards said first end wall; an abutment plate member disposed between said driving disk and said first end wall and having slanted recesses complementary to the recesses in said driving disk; ball elements received in said complementary recesses and on which said driving disk is displaceable longitudinally; means connecting said disks and said plate, said means being adapted to permit the longitudinal displacement of said shaft, said driving disk, said driven shaft, said disk and said second wall having passages connecting said peripheral inlet and outlets with the hydraulic operating cylinder and said central outlet in dependence on the axial displacement of the shaft and the longitudinal displacement of said plate.

2. A rotary valve mechanism for power drives in motor vehicles, comprising a valve housing having inlet and outlet ports, a driving shaft rotatable therein, a first disk-shaped rotary valve member secured to said driving shaft, a driven shaft coaxial with said driving shaft and provided with passages, a second driven disk-shaped rotary valve member secured to said driven shaft, a spacer bolt between said disks, adapted to allow lateral play therebetween, both said disks having complementary slanted recesses, ball elements between said recesses, for effecting axial movement of said driven disk member and said driven shaft, upon rotation of the driving shaft, said inlet ports communicating through the passages in the driven shaft with the groove in said first disk member and the groove in said second disk member with the outlet port.

3. In a motor vehicle provided with a power drive having a hydraulic operating cylinder and a steering shaft, a rotary valve mechanism comprising a cylindrical housing having a first end wall provided with a central outlet, a second end wall having on its periphery an inlet port and second and third outlet ports opposite said inlet port; a driven disk spaced adjacent said second wall; a driving disk secured to the steering shaft for rotation therewith and spaced from said driven disk, both said disks having grooves registering with one another for permitting the flow of hydraulic fluid between the disks, said disks having a pair of opposed bores of predetermined diameter terminating in semi-spherical recesses, a pair of tensioning bolts, each of said bolts extending through a respective bore in each of said disks, said bolts being of a smaller diameter than the diameter of said bores and having semi-spherical ends engaging in said recesses, whereby said bolts may assume an oblique position with respect to said disks during the rotation of said drive shaft to permit said bolts to displace the driven disk relative to the driving disk, to thereby control the passage of hydraulic fluid, said disk and said second wall having passages connecting said peripheral inlet and outlets with the hydraulic operating cylinder and said central outlet in dependence on the axial displacement of the shaft and the longitudinal displacement of said plate.

4. In a motor vehicle provided with a power drive having a hydraulic operating cylinder and a longitudinally grooved steering shaft, a rotary valve mechanism comprising a cylindrical housing having a first end wall provided with a central outlet, a second end wall having on its periphery an inlet port and second and third outlet ports opposite said inlet port; a driven disk spaced adjacent said second wall; a driving disk, a driven shaft, an abutment plate fixedly connecting said driven disk and said driven shaft, a centering spider, rigidly connected to said driving disk, a guide member axially displaceable in said grooves and secured to said spider thereby permitting the displacement of said driving disk relative to said driven disk, said driven disk having slanted recesses complementary to the recesses in said driving disk, both said disks having grooves registering with one another for permitting the flow of hydraulic fluid between the disks, said driving disk having slanted recesses on its face which is directed towards said first end wall; ball elements received in said complementary recesses and on which said driving disk is displaceable longitudinally; means connecting said disks and said plate, said means being adapted to permit the longitudinal displacement of said shaft, said driving disk, said driven shaft, said driven disk and said second wall having passages connecting said peripheral inlet and outlets with the hydraulic operating cylinder and said central outlet in dependence on the axial displacement of the shaft and the longitudinal displacement of said plate.

References Cited in the file of this patent
UNITED STATES PATENTS

| | | |
|---|---|---|
| 570,246 | Boluss | Oct. 27, 1896 |
| 2,380,369 | Nix | July 10, 1945 |
| 2,583,242 | Turkerkoph et al. | Jan. 22, 1952 |
| 2,600,674 | Natkins | June 17, 1952 |